(12) United States Patent
Pradhan et al.

(10) Patent No.: US 10,401,377 B2
(45) Date of Patent: Sep. 3, 2019

(54) OPTICAL SENSOR SYSTEM AND METHODS OF USE THEREOF

(71) Applicant: MICATU INC., Painted Post, NY (US)

(72) Inventors: Atul Pradhan, Pittsford, NY (US); Michael Oshetski, Horseheads, NY (US)

(73) Assignee: Micatu Inc., Horseheads, NY (US)

( * ) Notice: Subject to any disclaimer, the term of this patent is extended or adjusted under 35 U.S.C. 154(b) by 100 days.

(21) Appl. No.: 15/117,366

(22) PCT Filed: Feb. 13, 2015

(86) PCT No.: PCT/US2015/015763
§ 371 (c)(1),
(2) Date: Aug. 8, 2016

(87) PCT Pub. No.: WO2015/178975
PCT Pub. Date: Nov. 26, 2015

(65) Prior Publication Data
US 2016/0349284 A1    Dec. 1, 2016

Related U.S. Application Data

(60) Provisional application No. 61/939,570, filed on Feb. 13, 2014.

(51) Int. Cl.
*G01H 9/00* (2006.01)
*G01P 15/093* (2006.01)
*G01B 9/02* (2006.01)

(52) U.S. Cl.
CPC ........ *G01P 15/093* (2013.01); *G01B 9/02049* (2013.01); *G01H 9/004* (2013.01); *Y02B 10/30* (2013.01)

(58) Field of Classification Search
CPC ........ G01P 15/093; G01P 15/13; G01P 1/003; G01B 9/02049; G01H 9/004; G01L 1/24; G01L 1/25; G01L 3/12; G01L 9/0077
See application file for complete search history.

(56) References Cited

U.S. PATENT DOCUMENTS

| 3,567,325 A | 3/1971 | Tibbals, Jr. |
| 3,742,222 A | 6/1973 | Endl |

(Continued)

FOREIGN PATENT DOCUMENTS

| CN | 104283321 A | 1/2015 |
| CN | 104345233 A | 2/2015 |

(Continued)

OTHER PUBLICATIONS

PCT International Search Report and Written Opinion corresponding to PCT/US2016/027782, dated Jul. 12, 2016.

(Continued)

*Primary Examiner* — Helen C Kwok
(74) *Attorney, Agent, or Firm* — Pepper Hamilton LLP

(57) ABSTRACT

The present invention relates to a system comprising a light source configured to produce an emitted light beam. An etalon is positioned to receive the light beam and is configured to generate a plurality of product light beams. The etalon is mounted to a support structure at one or more pivot points. A detector is positioned to receive and configured to measure intensity values for the product light beams. A computing device is coupled to the detector. The computing device includes a processor and a memory coupled to the processor so that the processor executes programmed instructions stored in the memory to determine, based on the measured intensity values, a change in position of the etalon relative to the one or more pivot points. Also disclosed are (Continued)

methods for measuring the vibration and monitoring the condition of an object utilizing the system.

17 Claims, 15 Drawing Sheets

(56) References Cited

U.S. PATENT DOCUMENTS

| | | | |
|---|---|---|---|
| 3,824,018 A | 7/1974 | Crane, Jr. | |
| 5,081,635 A * | 1/1992 | Wakabayashi | G03F 7/70025 372/20 |
| 5,218,420 A * | 6/1993 | Asmar | G01P 15/093 356/480 |
| 5,396,172 A | 3/1995 | Lat et al. | |
| 5,764,678 A * | 6/1998 | Tada | H01S 3/03 372/107 |
| 5,896,193 A | 4/1999 | Colbourne et al. | |
| 5,903,158 A | 5/1999 | Eriksson et al. | |
| 6,057,911 A * | 5/2000 | Reich | G01B 11/161 356/35.5 |
| 6,446,217 B1 * | 9/2002 | Carroll | G01C 19/56 713/500 |
| 6,795,199 B2 * | 9/2004 | Suhami | A61B 3/102 356/601 |
| 7,136,169 B2 | 11/2006 | Sandstrom | |
| 7,395,698 B2 * | 7/2008 | Degertekin | B82Y 35/00 33/561 |
| 7,554,674 B2 * | 6/2009 | Carr | G01D 5/266 356/35.5 |
| 2002/0051270 A1 * | 5/2002 | Tatsuno | H01S 5/0687 398/192 |
| 2002/0154669 A1 * | 10/2002 | Spangler | G03F 7/70025 372/55 |
| 2005/0024645 A1 * | 2/2005 | Dorrer | G01J 3/12 356/450 |
| 2006/0010985 A1 * | 1/2006 | Schneider | G01P 1/003 73/765 |
| 2007/0279640 A1 * | 12/2007 | Carr | G01B 11/02 356/519 |
| 2009/0323737 A1 | 12/2009 | Ensher et al. | |
| 2011/0176128 A1 * | 7/2011 | Matsuno | G01J 3/26 356/72 |
| 2011/0222160 A1 * | 9/2011 | Yamazaki | G01J 3/46 359/589 |
| 2011/0249973 A1 * | 10/2011 | Donlagic | G01J 9/0246 398/79 |
| 2011/0317235 A1 | 11/2011 | Desai | |
| 2012/0031581 A1 | 2/2012 | Chillar et al. | |
| 2012/0050735 A1 * | 3/2012 | Higgins | G01L 1/24 356/326 |
| 2012/0092114 A1 | 4/2012 | Matthews | |
| 2012/0113434 A1 * | 5/2012 | Tokimitsu | G01B 9/02004 356/498 |
| 2012/0315002 A1 | 12/2012 | Wigley et al. | |
| 2013/0077072 A1 * | 3/2013 | Spruit | G03F 7/70575 355/67 |
| 2014/0118003 A1 | 5/2014 | Chen et al. | |

FOREIGN PATENT DOCUMENTS

| | | |
|---|---|---|
| DE | 102007013466 A1 | 10/2008 |
| DE | 102012109640 A1 | 4/2014 |
| EP | 1786083 A1 | 5/2007 |
| WO | 2012/031447 A1 | 3/2012 |
| WO | 2014014783 A1 | 1/2014 |

OTHER PUBLICATIONS

EP Search Report for EP Application No. 15795374.6, dated Sep. 26, 2017.

Zook et al., "Fiber-Optic Vibration Sensor Based on Frequency Modulation of Light-Excited Oscillators", Sensors and Actuators 83 (2000), pp. 270-276.

Oursler et al., "Full-Field Vibrometry Using a Fabry-Perot Etalon Interferometer" Applied Optics, vol. 31, No. 34, (1992), pp. 7301-7308.

Furstenau et al., "Fiber-Optic Extrinsic Fabry-Perot Interferometer Vibration Sensor with Two-Wavelength Passive Quadrature Readout", IEE Transactions on Instrumentation and Measurement, IEE Service Center, vol. 47, No. 1 (1998), pp. 143-147.

International Search Report and Written Opinion for corresponding PCT Application No. PCT/US2015/015763 (dated Nov. 13, 2015).

EP Search Report for EP Application No. 16780848.4, dated Nov. 29, 2018.

* cited by examiner

OPTICAL SENSOR SYSTEM AND METHODS OF USE THEREOF

This application is a U.S. national stage application under 35 U.S.C. § 371 of PCT Application No. PCT/US2015/015763, filed Feb. 13, 2015, which claims the priority benefit of U.S. Provisional Patent Application Ser. No. 61/939,570 filed Feb. 13, 2014, which is hereby incorporated by reference in its entirety.

FIELD OF THE INVENTION

The present invention relates to an optical sensor system and methods of use thereof.

BACKGROUND OF THE INVENTION

There are many applications for vibration sensors and accelerometers, i.e., devices that measure physical displacement in at least one direction. These vibration sensors may be coupled to an object to determine the extent of vibration and otherwise monitor the condition of the object. At present, displacement sensors generally fall into two categories: 1) piezoelectric sensors; 2) microelectromechanical systems (MEMS) sensors; and 3) optical sensors, which are most commonly optical fibers.

Piezoelectric sensors utilize electrical signals generated by the compression of a voltage-generating crystal or ceramic (a piezeoelectric substance) to measure displacement. Piezoelectric sensors cannot be used to measure static forces which result in a fixed charge on the piezoelectric material. Further, short term accuracy of piezoelectric sensors can vary without significant signal conditioning and electronic processing of signals. Such techniques, however, subject the piezoelectric sensor to substantial electromagnetic and radio frequency interference. Piezoelectric sensors that measure vibration are also subject to long term drift in accuracy due to material degradation. These sensors are also limited in the applications to which they may be applied as piezoelectric systems can exhibit problems in electrical signal strength and dynamic range, drawbacks that are amplified in high-electrical-noise environments. The internal resistance of piezoelectric materials is also highly sensitive to environmental factors (e.g., temperature) resulting in noise that limits resolution. Further, piezoelectric sensors tend to have high errors and low sensitivity at low to moderate frequency of vibration. Piezoelectric sensors with higher accuracy levels are complex and expensive to produce.

MEMS sensors similarly have several drawbacks. MEMS sensors often have small sensing chips that are subject to Brownian thermal noise. The measured acceleration value of a MEMs sensor is a product of displacement times angular resonant frequency squared so that a high-frequency vibration with very small displacement or low frequency vibration with a large displacement will result in very high acceleration values. For mechanical transfer function and resonant frequency bandwidths in the range of 0.1 Hz to 10 kHz, given the very low mass of a MEMS sensor chip and small MEMS displacements, the signal to noise ratio can be quickly dominated by Brownian Noise, which limits resolution of the sensor.

Currently available optical sensors utilize indirect measurements of motion, resulting in additional complexity. Specifically, optical sensors rely on various methods of deformation of an optical path traversed by a light beam (typically a coherent light beam as generated by a laser). Optical sensors, such as fiber sensors, are similarly suboptimal in terms of measurements, as they lack sensitivity and require complex analysis of the wavelength or phase shift of the light. This analysis must be performed using complex, expensive, and fragile instrumentation such as a spectrometer or optical interrogator. In addition, optical fibers utilized as optical sensors have fixed optical cavities that are of limited use for measuring vibration as noise is introduced over high frequency bandwidths.

The present invention is directed to overcoming these and other deficiencies in the art.

SUMMARY OF THE INVENTION

One aspect of the present invention relates to a system comprising a light source configured to produce an emitted light beam. An etalon is positioned to receive the emitted light beam from the light source and is configured to generate a plurality of product light beams from the emitted light beam. The etalon is mounted to a support structure at one or more pivot points. A detector is positioned to receive the plurality of product light beams generated from the etalon and is configured to measure intensity values for the plurality of product light beams. A computing device is coupled to the detector. The computing device includes a processor and a memory coupled to the processor so that the processor executes programmed instructions stored in the memory to determine, based on the measured intensity values, a change in position of the etalon relative to the one or more pivot points.

Another aspect of the invention relates to the system of the present invention further including a housing having walls defining a chamber within which the etalon is located. A first optical fiber is coupled to the light source and positioned in the housing to direct the emitted light beam to the etalon. A second optical fiber is coupled to the detector and positioned in the housing to collect the plurality of product light beams emitted from the etalon and deliver the collected plurality of product light beams to the detector.

A further aspect of the invention relates to a method for measuring vibration of an object. The method involves providing the system of the present invention and coupling the housing to a surface of the object. The intensity values for the plurality of the product light beams are measured over a period of time. Any change in position of the etalon relative to the one or more pivots over the period of time is determined based on the measured intensity values over the period of time. An acceleration value for the object is determined over the period of time based on the change in position of the etalon over the period of time to measure the vibration of the object.

A further aspect of the invention relates to a method for monitoring a condition of an object. The method involves providing the system according to the present invention and coupling the housing to a surface of the object. The intensity values for the plurality of product light beams are measured over a period of time. Any change in position of the etalon relative to the one or more pivot points over the period of time is determined based on the measured intensity values over the period of time. A frequency value for the object over the period of time is determined based on the change in position of the etalon over the period of time. The determined frequency value is monitored over the period of time for changes in the frequency value to monitor the condition of the object.

The system of the present invention provides a system that utilizes a fully passive optical sensor that may be utilized to monitor the condition of an object for various applications. As the optical sensor component does not include any active components, but only passive optical components, the sensor may be deployed in harsh environments including environments exposed to high temperatures, high electromagnetic fields, or high voltage, for example.

The system advantageously utilizes an etalon in the optical sensor. The displacement of the etalon may be measured and correlated to parameters related to the object, such as acceleration, rotation, or temperature changes. The system, however, does not need to determine changes in phase or shift in wavelength for light passing through the etalon as generally utilized in etalon based applications, and thus requires less complexity.

Further, the use of an etalon provides for an optical sensor that provides a higher response voltage than traditional vibration sensors, particularly at lower frequencies where traditional vibration sensors fail. Thus, the system of the present invention may advantageously be utilized in applications with low level frequency of vibration.

DETAILED DESCRIPTION

The present invention relates to an optical sensor system and methods of use thereof. More specifically, the present invention relates to an optical sensor system, a method of measuring vibration of an object using the system, and a method of monitoring the condition of an object using the system.

One aspect of the present invention relates to a system comprising a light source configured to produce an emitted light beam. An etalon is positioned to receive the emitted light beam from the light source and is configured to generate a plurality of product light beams from the emitted light beam. The etalon is mounted to a support structure at one or more pivot points. A detector is positioned to receive the plurality of product light beams generated from the etalon and is configured to measure intensity values for the plurality of product light beams. A computing device is coupled to the detector. The computing device includes a processor and a memory coupled to the processor so that the processor executes programmed instructions stored in the memory to determine, based on the measured intensity values, a change in position of the etalon relative to the one or more pivot points.

Figure 1:
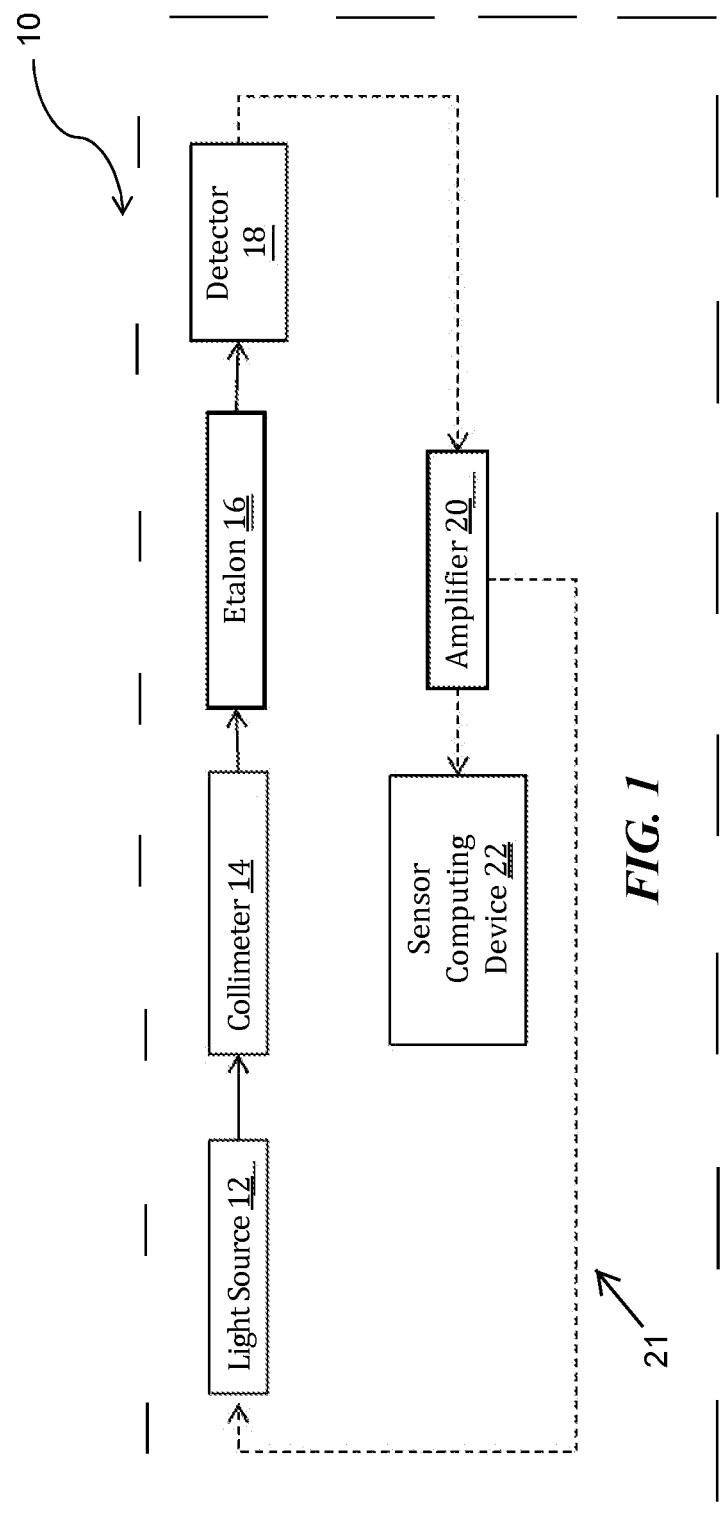
FIG. 1 is a block diagram of an embodiment of a system of the present invention.

FIG. 1 is a block diagram of an embodiment of system 10 of the present invention. System 10 includes light source 12, collimator 14, etalon 16, detector 18, amplifier 20, and sensor computing device 22. System 10 may also include other types and numbers of elements, components, or devices in other configurations, including additional optics, such as lenses, prisms, or filters, or electronics, such as additional amplifiers, AC to DC converters, or transducers, by way of example only. Additional optics may be utilized, by way of example, to redirect, focus, collimate, or filter the wavelength of light with the system. Additional electronics may be utilized, by way of example, to condition the signal from detector 18 to facilitate further processing.

Light source 12, according to one embodiment, may be any suitable laser diode that produces a temporally or spatially coherent, or partially coherent, light beam, such as a He Ne gas laser operating at a wavelength of approximately 632 nm. Alternatively, other laser diodes, operating at other wavelengths, such as 1310 or 1550 lasers, may be utilized. In another embodiment, light source 12 may be a non-coherent source, such as a light emitting diode or superluminescent diode by way of example only, coupled with optics or filters to spectrally narrow the linewidth or spatially filter the emitted light beam.

Collimator 14 is located between light source 12 and etalon 16 to provide a collimated light beam to etalon 16, which assists in obtaining a high modulation intensity from etalon 16. Collimator 14, according to one embodiment, includes a collimating lens, or series of lenses, configured to provide a very low divergence, collimated light beam to etalon 16, although other optical elements in other combinations may be utilized to collimate, or otherwise shape, the light beam emitted from light source 12.

According to one embodiment, light source 12 is coupled to an optical fiber, such as a single mode optical fiber, although multi-mode fibers may be utilized, that delivers light emitted from light source 12 to etalon 16. The use of an optical fiber coupled to light source 12 allows light source 12 to be located remotely from etalon 16.

Etalon 16, which may also be referred to as a Fabry-Perot interferometer, is configured to produce an interference pattern of light incident upon etalon 16. Etalon 16 is positioned to receive the emitted light beam from light source 12 and moveable with respect to one or more pivot points described in the embodiments below.

Figure 2:
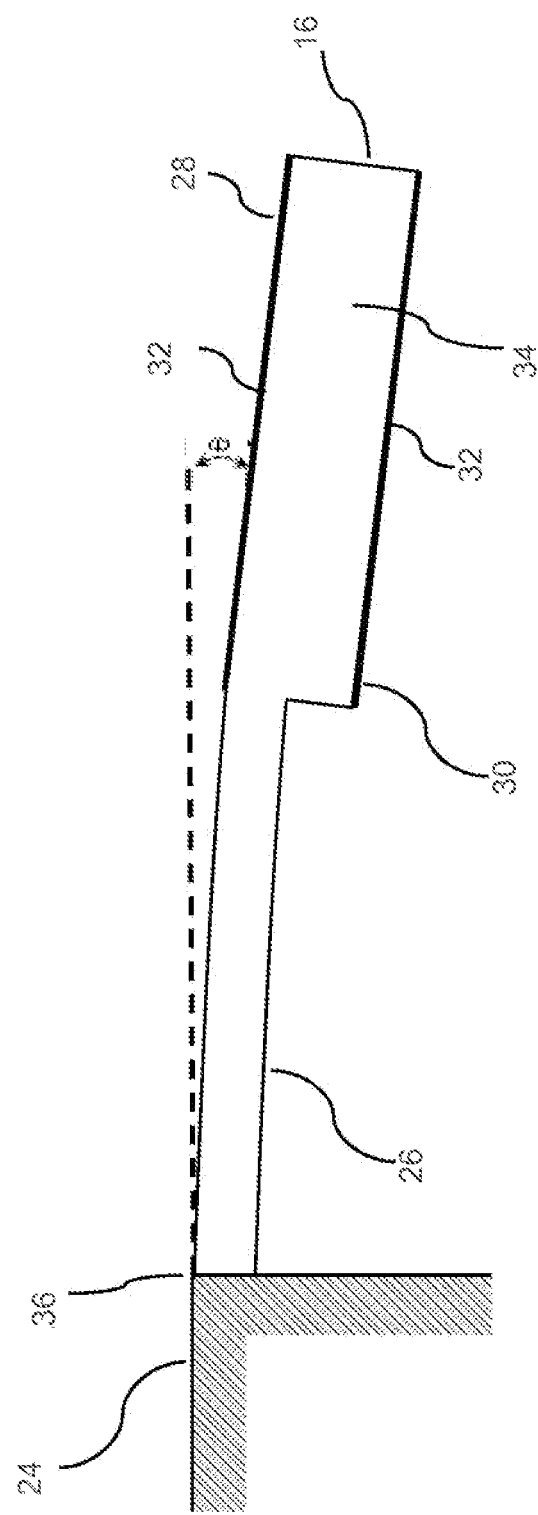
FIG. 2 is a side view of an embodiment of an etalon coupled to a support structure to provide angular displacement of the etalon about a pivot points for use in the system illustrated in FIG. 1.

FIG. 2 illustrates an exemplary etalon 16 mounted to support structure 24 by cantilever arm 26 that may be utilized in system 10 of the present invention, although etalon 16 may be coupled to other types of support structures as described below. Etalon 16 includes a partially reflective first surface 28 and a partially reflective second surface 30 that is parallel to first surface 28. In one embodiment, first surface 28, second surface 30, or both first surface 28 and second surface 30 have a reflective coating 32 thereon to increase the reflectivity.

First surface 28 and second surface 30 are spaced apart from one another at a fixed distance by optical cavity 34. According to one embodiment, optical cavity is a solid material, although first surface 28 and second surface 30 may be separated by air, or other gas. Etalon 16 is configured to receive an incoming light beam at first surface 28 and emit a plurality of product light beams with a resultant interference pattern. Etalon 16 may be constructed of any suitable materials known in the art and may be selected to function optimally with the wavelength of light emitted by light source 12.

According to one embodiment, cantilever arm 26 is mounted to support structure 24 at pivot point 36 to provide angular displacement (A) of etalon 16 with respect to pivot point 36, although etalon 16 may be coupled to other types of support structures in other ways to provide an angular displacement with respect to one or more pivot points. In one embodiment, support structure 24 includes a housing comprising walls defining a chamber within which etalon 16 is located as described below. Cantilever arm 26 is configured to bend to provide the angular displacement (A) of etalon 16 with respect to pivot point 36. Cantilever arm 26 is constructed of a material selected to provide a resonant frequency range based on the application for which etalon 16 is to be utilized. According to one embodiment, etalon 16 serves as an end mass for cantilever arm 28 to reduce the resonant frequency of cantilever arm 28. In another embodiment, etalon 16 is coupled directly to structure 24 and extends from support structure 24 to act as a cantilever itself.

Figure 3:
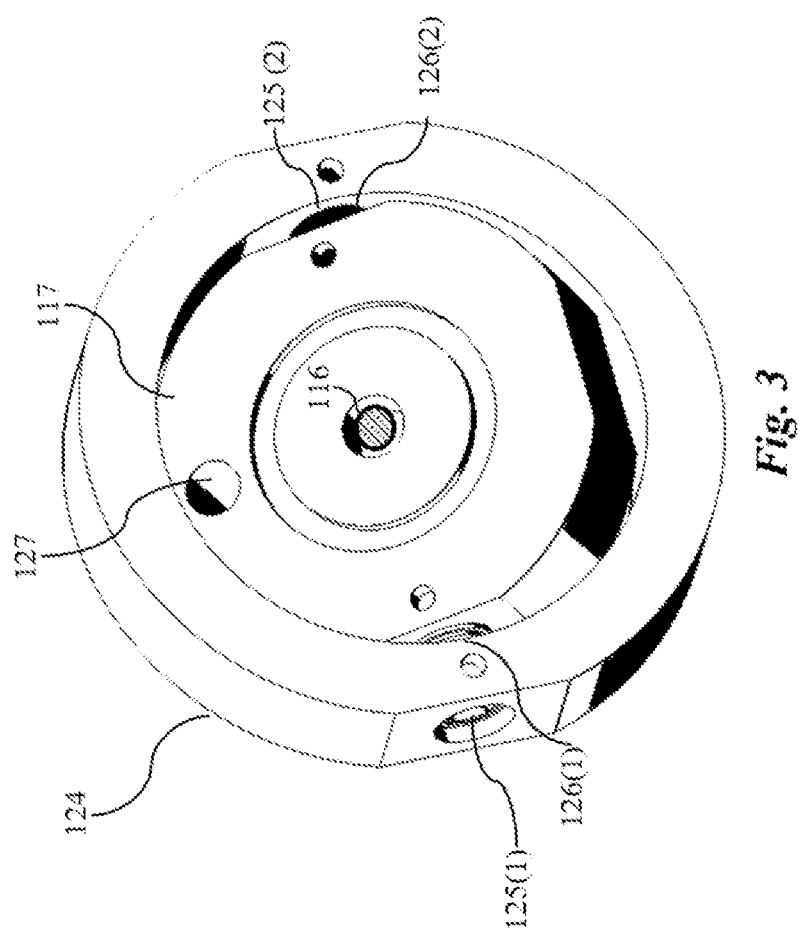
FIG. 3 is a perspective view of an alternative embodiment of an etalon coupled to a support structure to provide angular displacement of the etalon about a pair of pivot points for use in the system illustrated in FIG. 1.

FIG. 3 illustrates a perspective view of an exemplary etalon 116 of the present invention mounted to support structure 124, which is an annular ring, by gimbal pivots 125(1) and 125(2), which provide pivot points 126(1) and 126(6), respectively. In this embodiment, etalon 116 is located within a center ring 117 that provides support for etalon 116. Center ring 117 is coupled to support structure 124 by gimbal pivots 125(1) and 125(2), which are c-flex springs that allow etalon 116 to be angular displaced about pivot points 126(1) and 126(2) provided by gimbal pivots 125(1) and 125(2). Center ring 117 further includes mass offset 127 that may be configured to tune the resonant frequency of etalon 116 based on the particular application.

Referring again to FIG. 1, detector 18 is positioned to receive product light beams generated from etalon 16, as described below, and to measure intensity values for the product light beams based on the generated interference pattern. Detector 18 may be positioned to receive either product light beams transmitted through etalon 16, or product light beams reflected from etalon 16, which both demonstrate the same interference pattern. According to one embodiment, detector 18 is a silicon photodiode. Other types and numbers of photodetectors, such as an InGaAs detector, HgTe detector, photomultipliers, CCD, or CMOS detectors may be utilized. Detector 18 has a fast response time in order to receive and detect intensity values for the modulated light emitted from etalon 16. Detector 18 may be any suitable photodetector and may be selected based on the application, i.e., the wavelength of light to be detected.

Detector 18 may be coupled to an optical fiber, such as a single mode optical fiber, although multimode optical fibers may be utilized, such that the optical fiber collects light from etalon 16 and transmits the light to detector 18. The use of an optical fiber coupled to detector 18 allows detector 18 to be located remotely from etalon 16.

Referring again to FIG. 1, detector 18 may be coupled to amplifier 20 to prepare the signal from detector 18, i.e., the measured intensity values of the product light beams, for further processing, although other electronics may be utilized to adjust the output signal. According to one embodiment, amplifier 20 is a transimpedance amplifier, although other types of amplifiers or signal conditioning electronics may be utilized. System 10 may further include a feedback loop 21 to adjust light source 12 based on the received signals from detector 18.

Figure 4:
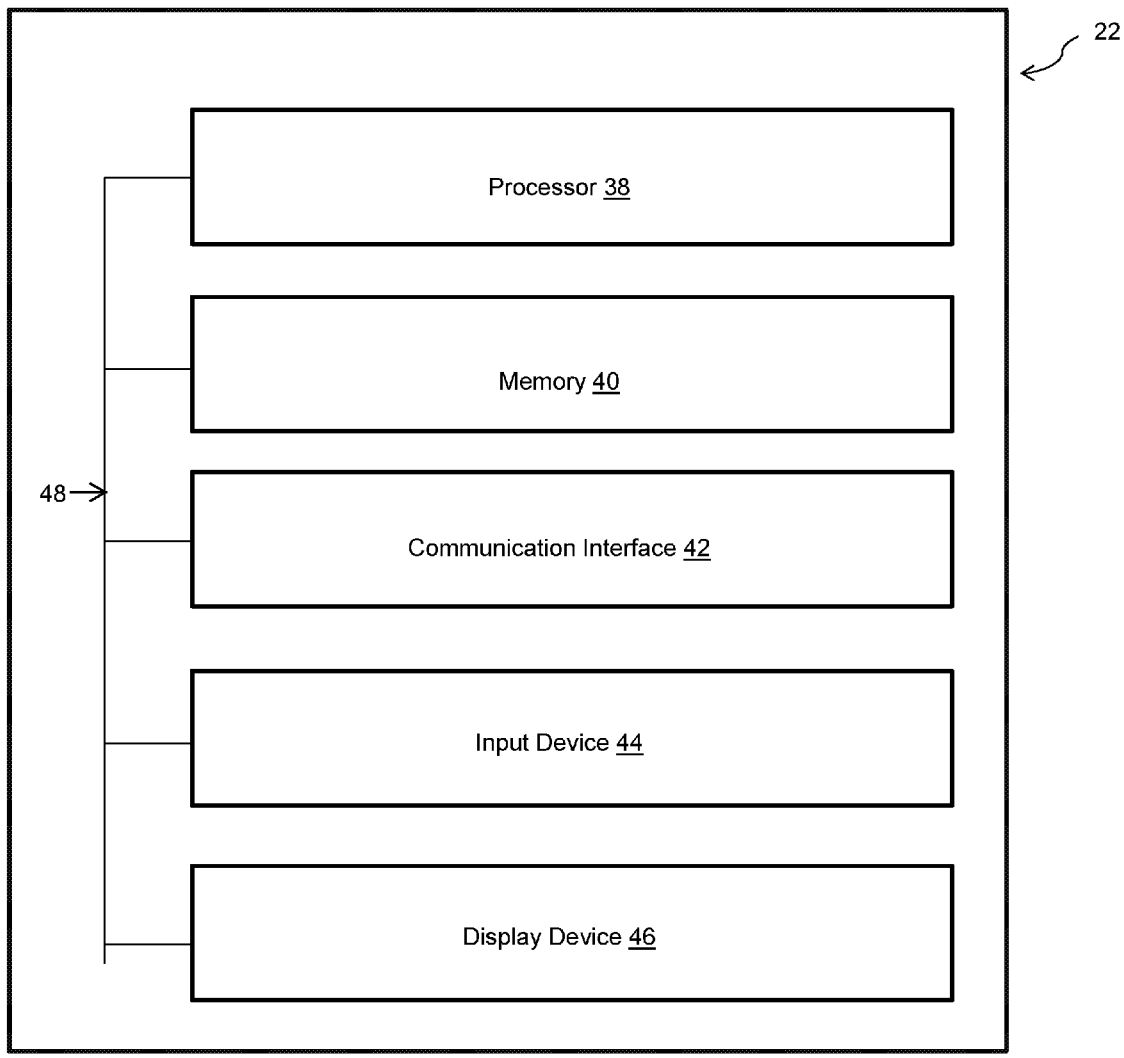
FIG. 4 is a block diagram of an exemplary sensor computing device for use in the system illustrated in FIG. 1.

Detector 18 is coupled, through amplifier 20 to sensor computing device 22. Referring now more specifically to FIG. 4, sensor computing device 22 is configured to determine a change in position of the etalon with respect to one or more pivot points in accordance with the methods described herein. Sensor computing device 22 includes processor 38, memory 40, communication interface 42, input device 44, and display device 46, which are coupled together by bus 48 or other communication link, although other numbers and types of systems, devices, components, and elements in other configurations and locations can be used.

Processor 38 executes a program of instructions stored in memory 40 for one or more aspects of the present technology. Other numbers and types of systems, devices, components, and elements in other configurations and locations can be used to execute the program of instructions stored in memory 40.

Memory 40 stores these programmed instructions for one or more aspects of the present technology, although some or all of the programmed instructions could be stored and/or executed elsewhere. A variety of different types of memory storage devices, such as a random access memory (RAM), read only memory (ROM), hard disk, CD ROM, DVD ROM, or other computer readable medium which is read from and written to by a magnetic, optical, or other reading and writing system that is coupled to processor 38, can be used for memory 40.

Communication interface 42 is used to operatively couple and communicate between sensor computing device 22 and one or more other computing devices via a communications network. Other types and numbers of communication networks or systems with other types and numbers of connections and configurations can be used for communication between sensor computing device 22 and one or more other computing devices. By way of example only, the communications network could use TCP/IP over Ethernet and industry-standard protocols, including NFS, CIFS, SOAP, XML, LDAP, and SNMP. Other types and numbers of communication networks, such as a direct connection, a local area network, a wide area network, modems and phone lines, e-mail, and wireless communication technology, each having their own communications protocols, can be used by the communication networks.

The input device 44 and display device 46 of sensor computing device 22 enable a user to interact with sensor computing device 22, such as to input and/or view data and/or to configure, program, and/or operate sensor computing device 22, by way of example only. Input device 44 may include a keyboard, computer mouse, and/or touch screen, and display device 46 may include a computer monitor. Other types and numbers of input devices and/or display devices could also be used in other examples.

Another aspect of the invention relates to the system of the present invention further including a housing having walls defining a chamber within which the etalon is located. A first optical fiber is coupled to the light source and positioned in the housing to direct the emitted light beam to the etalon. A second optical fiber is coupled to the detector and positioned in the housing to collect the plurality of product light beams emitted from the etalon and deliver the collected plurality of product light beams to the detector.

Figure 5A:
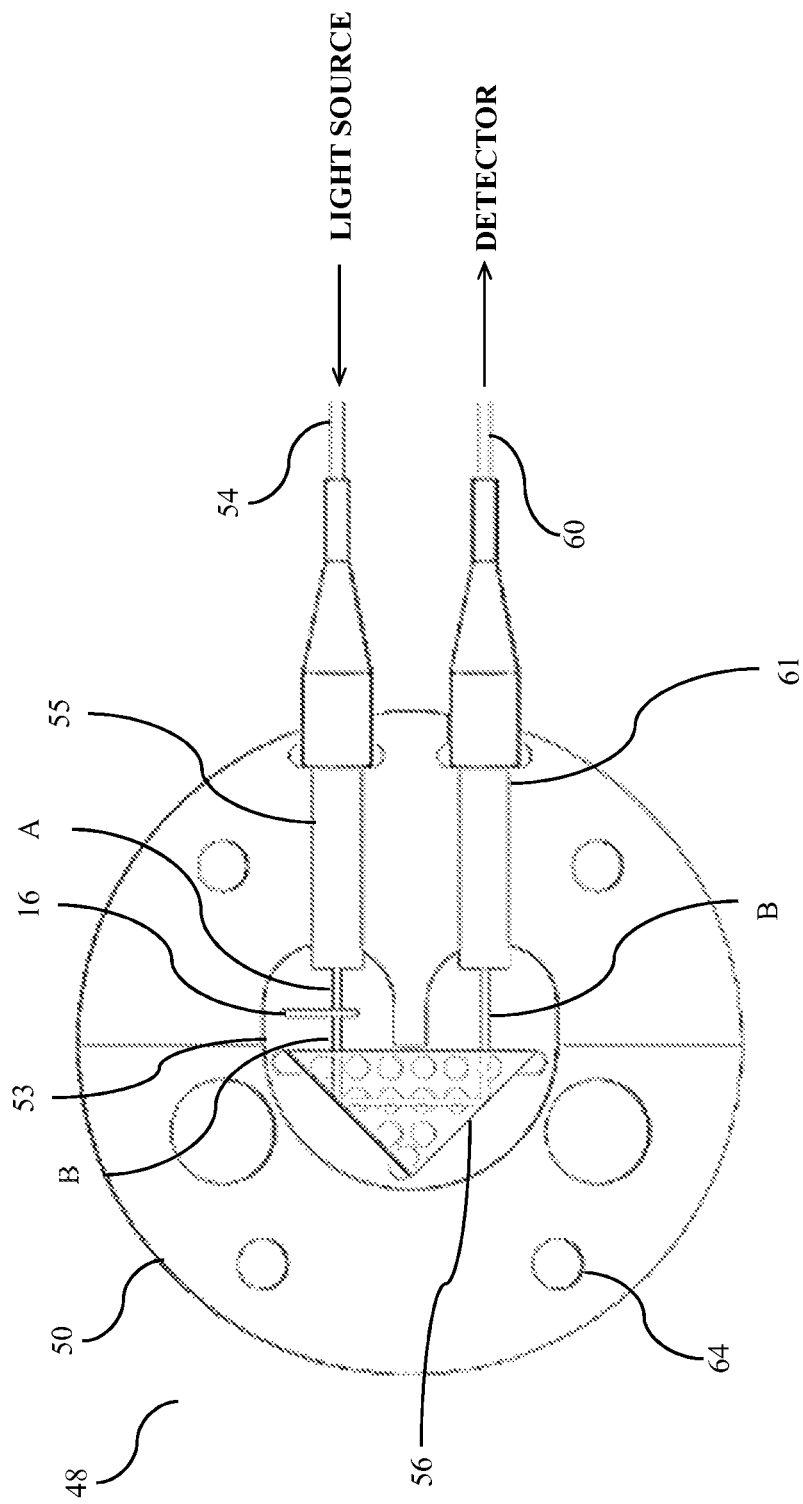
FIG. 5A is a top view of an exemplary base of a housing configured to house an etalon in accordance with an embodiment of the present invention.
Figure 5B:
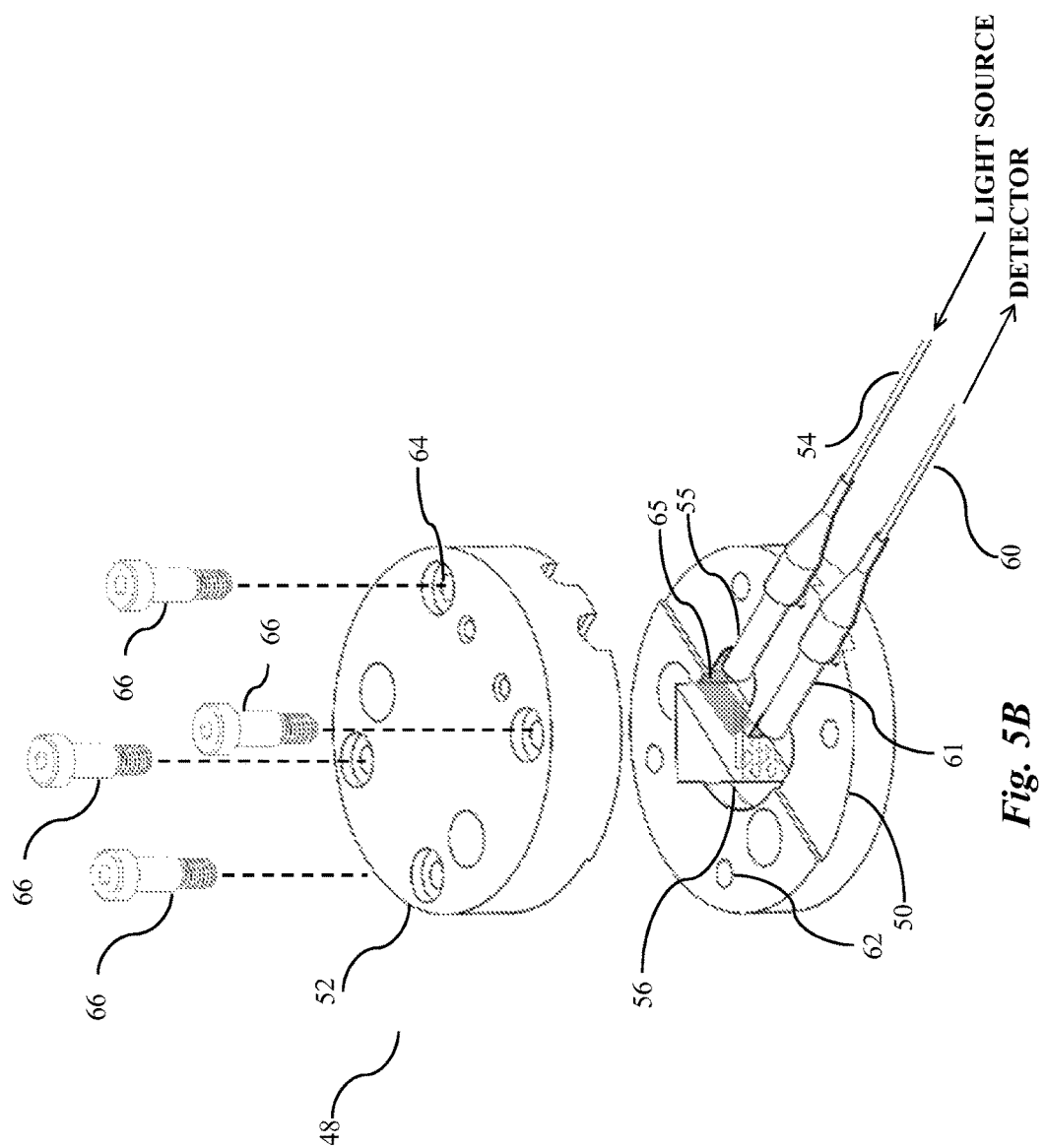
FIG. 5B is an exploded perspective view of an exemplary housing configured to house an etalon in accordance with an embodiment of the present invention.

Referring now to FIGS. 5A and 5B, according to one embodiment, etalon 16 is located within housing 48, which includes base 50 and top cover 52, which may be coupled together. Housing 48 may be constructed of any suitable plastic or metal designed to weather the environment in which housing 48 is to be placed.

Base 50 includes inner wall 53 which defines a chamber in which etalon 16 is located. According to one embodiment, etalon 16 extends from inner wall 53 as a cantilever, such that etalon 16 may be angularly displaced. Alternatively, etalon 16 may be spring loaded within the chamber to have a pivot point for angular displacement. Base 50 is configured to receive first optical fiber 54, which is coupled to a light source (not shown). The light source may be any suitable light source, such as light source 12 described with respect to FIG. 1 above.

First optical fiber 54 is positioned within housing 48 to direct a light beam into collimator 55, which produces a collimated light beam A that is directed to etalon 16. Base 50 is further configured to hold optical prism 56, which is positioned to receive product light beams B transmitted through etalon 16, which are superpositioned such that their constructive and destructive interference produces a modulated intensity signal, and redirect product light beams B 180 degrees, as product light beams B' that travel in a direction opposite to, yet still parallel to, collimated light beam A. Base 50 may hold other elements to direct the product light beams B in other directions. Base 50 may further hold other optic devices, such as lenses, filters, or collimators, to focus, filter, or collimate either light beam A or product light beams B.

Base 50 is further configured to receive second optical fiber 60, which is coupled to a detector (not shown). The detector may be any suitable detector, such as detector 18 described with respect to FIG. 1 above. Second optical fiber 60 is positioned within housing 48 to collect product light beams B' from collimator 61 and transmit product light beams B' to the detector. In this configuration, the light source and detector, which include active electronics, may be located remotely from housing 48, which contains solely passive optical sensing elements, including etalon 16. Base 50 further includes one or more holes 62 configured to receive an attachment mechanism, such as a threaded screw, for attachment of top cover 52.

Top cover 52 provides a protective cover and is configured to fit over base 50. Top cover 52 includes one or more holes 64 configured to align with holes 62 of base 50 and to receive an attachment mechanism, such as threaded screw 66, for attachment of top cover 52 to base 50. Although housing 48 is described to include only the passive optical components, housing 48 could further house a light source and detector in accordance with system 10 of the present invention to provide a packaged optical sensor system, such as a MEMS package.

Figure 6:
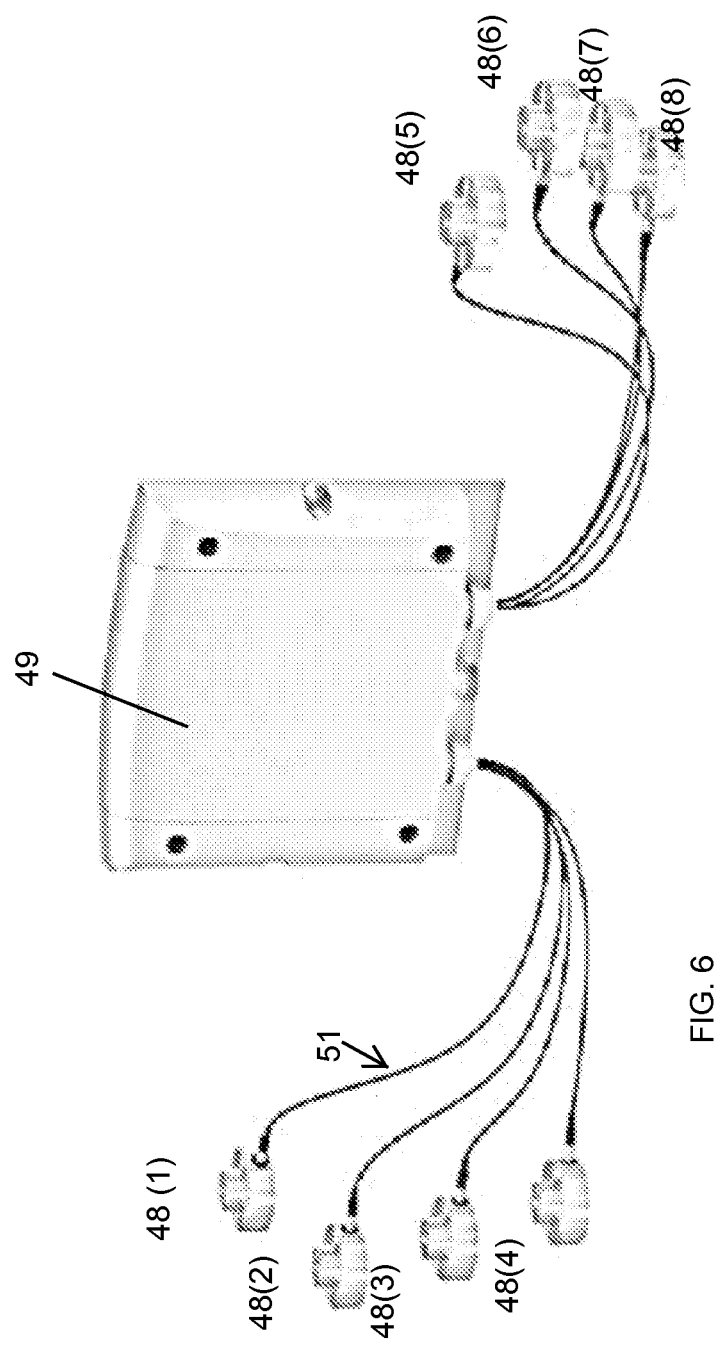
FIG. 6 is a perspective view of a system of the present invention including a plurality of housings, each of the housings including an etalon, coupled to a detector and a light source in accordance with an embodiment of the present invention.

Referring now to FIG. 6, according to one embodiment, a plurality of housings 48(1)-48(n) may be connected to device 49, which houses any active components of the system, such as the light source, detector, and any additional electronics, via optical cables 51 that house separate optical fibers (not shown) for connection of each housing 48(1)-48(n) to a light source and one or more detectors. Each of the housings 48(1)-48(n) may be located separately on an object. Each of the housings 48(1)-48(n) may further be located remotely from the active electronics of the light source and detector, which are located within device 49. In one embodiment, one or more housings of the present invention may be located on the object being measured for vibration or monitored with the active components (i.e., light source, detector, and other electronics) near the device and the housings located in an area on the device.

According to one embodiment of the present invention, system 10 may detect vibration of an object, or monitor the condition of an object, e.g., determine changes in the standard frequency of the object to identify potential failure states, or a change in environmental conditions surrounding the object. In one example, system 10 may be located in an integrated package that may be coupled to the object. Alternatively, housing 48 may be coupled to the object with other components, such as the light source and detector located remotely. By way of example, housing 48 may be coupled to an object and connected to a light source and detector, as described above, by fiber optic cables such that the light source and detector are located remotely from housing 48. In another embodiment, a plurality of housings 48(1)-48(n) coupled to the same light source and detector may be coupled to one or more objects. Alternatively, a plurality of housings 48(1)-48(n) may be utilized that are each coupled to a separate light source and detector may be utilized on an object.

Figure 7:
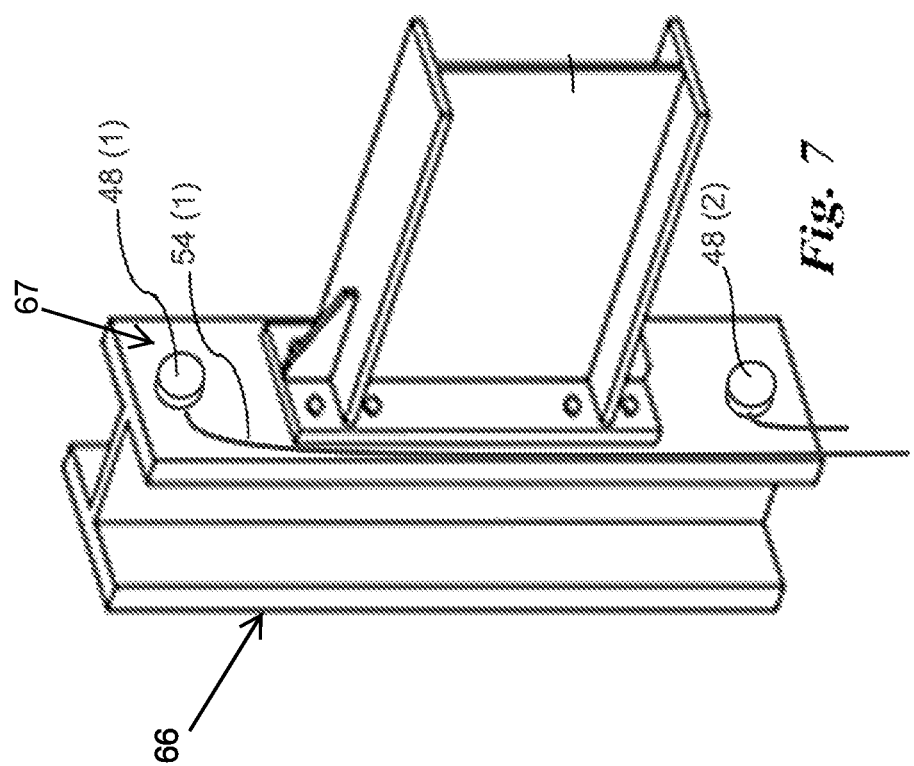
FIG. 7 is a side perspective view of a static structure including two housings of the present invention, each of the housings including an etalon, coupled to the static structure.

In one embodiment, housings 48(1) and 48(2) are coupled to static structure 66, such as the object including a planar surface 67 as shown in FIG. 7, although housings 48 may be coupled to other types and numbers of static structures. Although, two housings 48(1) and 48(2) are shown, it is to be understood that other numbers of housings in other locations on static structure 66 may be utilized. Housings 48(1) and 48(2) are connected by optical fibers, which are encased within optical cables 51, to a light source (not shown) and detector (not shown) to deliver a light beam to housing 48 and collect light from the housing in accordance with system 10 of the present invention. In this application, the system is utilized to measure vibrations imparted on the normally static surface 66. By way of example only, housings 48(1) and 48(2) may be applied to static structure 66 in any applications where accelerometers or gyroscopes are used to detect motion of normally static structure 66.

Figure 9:
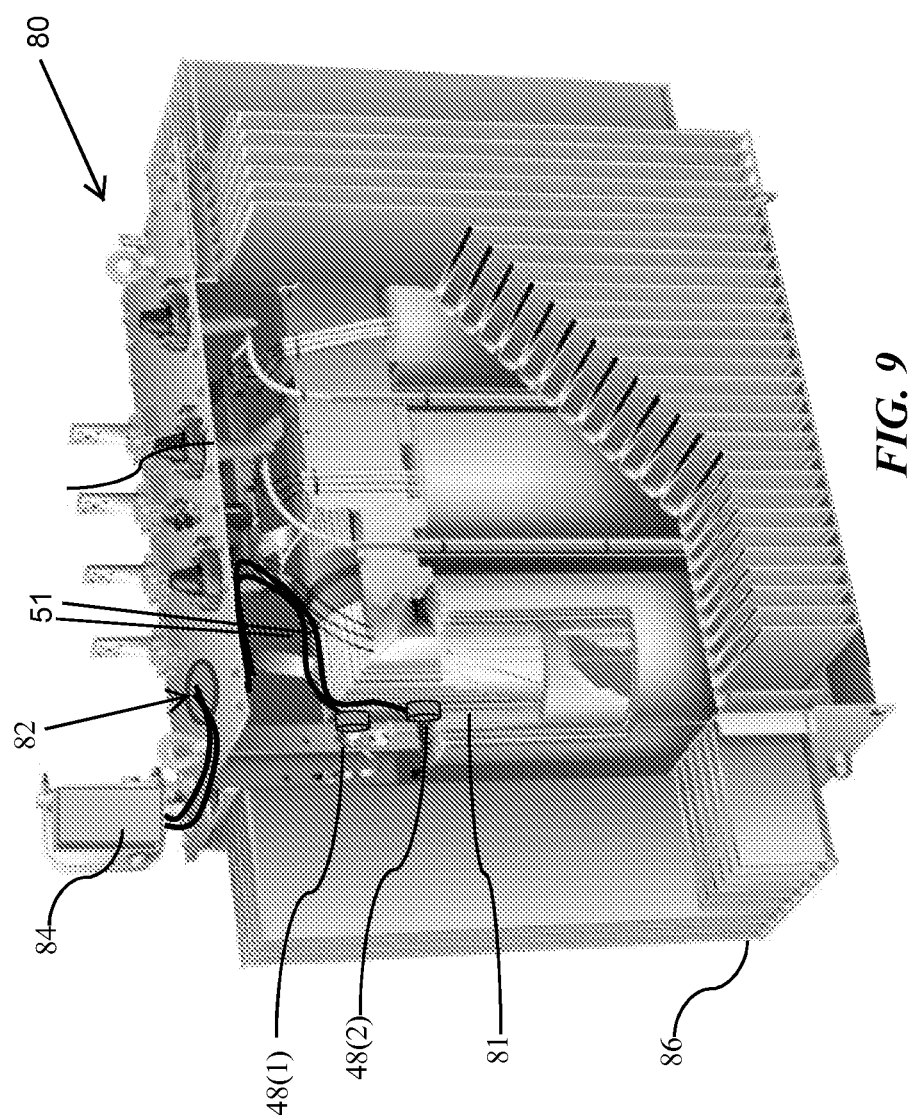
FIG. 9 is a partial cross-sectional perspective view of a transformer incorporating an embodiment of the system of the present invention.

In another embodiment, housings 48(1)-48(4) are coupled to non-static structure 70, such as the rotating shaft system as shown in FIG. 9. In other embodiments, housings 48(1)-48(4) may be coupled to other types and numbers of non-static structures or rotating objects. Although four housings 48(1)-48(4) are shown, it is to be understood that other numbers of housings in other locations on non-static structure 70 may be utilized. In one example, housings 48(1)-48

(4) are coupled to the rotating shaft on opposing ends of bearing housings 71(1) and 71(2), which hold ball bearings that allow for rotation of the shaft. Housings 48(1)-48(4) are connected by optical fibers, which are encased within optical cables 51, to a light source (not shown) and detector (not shown) to deliver a light beam to housings 48(1)-48(4) and collect light from the housing in accordance with system 10 of the present invention. In this application, the system is utilized to measure vibration of the non-static structure 70. The system may determine a standard operating frequency of non-static structure 70. Changes in the operating frequency may be monitored to determine potential failure states of non-static structure.

According to another embodiment, housings 48(1) and 48(2) may be installed in a high energy environment 80, such as the transformer illustrated in FIG. 9, although the present invention may be utilized in other harsh environments, such as high temperature environments. Although, two housings 48(1)-48(2) are shown, it is to be understood that other numbers of housings may be utilized in environment 80. Housings 48(1) and 48(2) are located within the transformer winding case 81. The passive optical components with housings 48(1)-48(n) are not impacted by the high electromagnetic fields in this environment. In this example, optical cables 51 holding optical fibers coupled to a light source and detector, respectively, pass from housings 48(1) and 48(2) through hermetic fiber connectors at location 82. Fiber cables 51 connect to control box 84 on transformer enclosure 86, which houses the active components of the system of the present invention. In this application, the system may utilized to monitor vibrations or monitor a parameter, such as temperature or a vibration frequency, to determine conditions above a threshold and to identify potential failure states.

Other objects, including static and non-static structures, that may be monitored by the system of the present invention include, without limitation a transformer, a wind turbine, a building, a bridge, a dam, a road, a canal sidewall, an object associated railroad infrastructure, a highway overpass, an aircraft, a ship, a train, an automobile, a spacecraft, a truck, an industrial machine, a factory machine, a centrifuge, an ultracentrifuge, a microscope, a balance, a nanofabrication device, a household appliance, a gaming device, a game controller, a smart phone, a tablet device, a laptop computer, an e-reader, an MP3 player, a telephony headset, headphones, a router, a camera, a power tool, a medical device, and a human body monitoring device.

Figure 10:
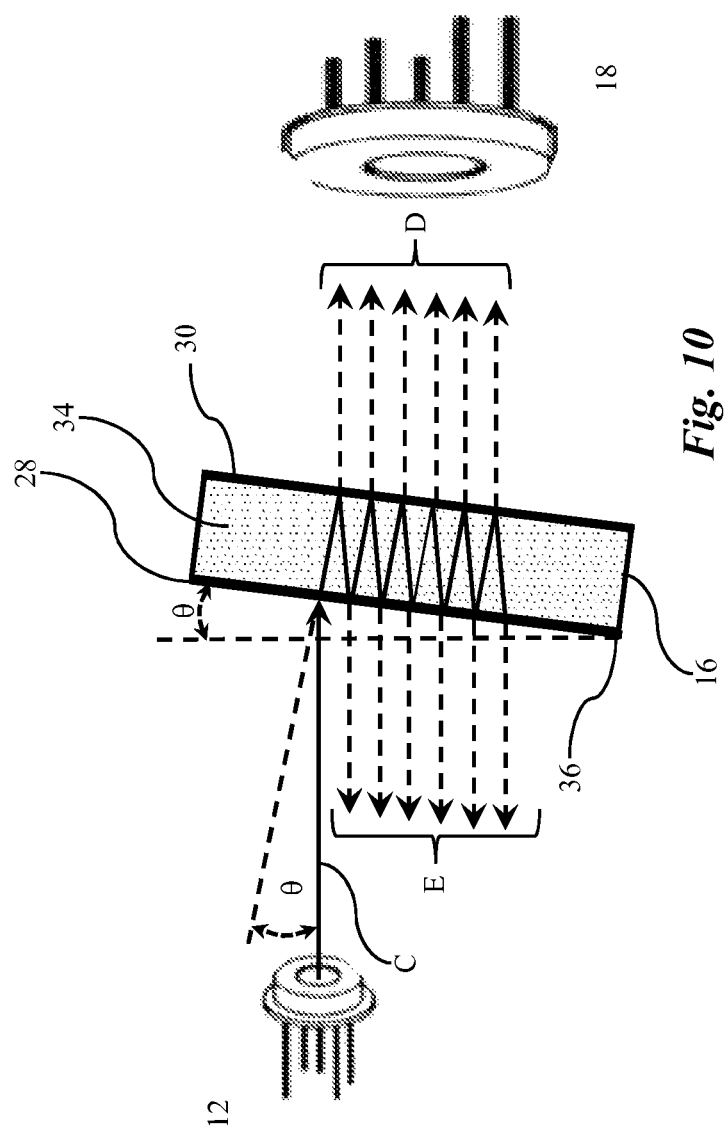
FIG. 10 is schematic of the operation of an exemplary etalon of the present invention.

An exemplary operation of the system of the present invention will now be described with reference to FIGS. 1 and 10. Light source 12 emits light beam C, which is directed toward etalon 16. As described above, collimator 14 may be utilized to collimate light beam C prior to interaction with etalon 16. Other beam shaping optics may be utilized, such as filters or lenses, prior to etalon 16. Light beam C enters etalon 16 at first surface 28 and creates an interference pattern based on the reflection of light between first surface 28 and second surface 30. The interference pattern is demonstrated in both light transmitted through second surface 30 as product light beams D, and reflected from first surface 28 as product light beams E. Detector 18 is illustrated in FIG. 10 as positioned to receive product light beams D, but may alternatively be arranged to receive product light beams E in another embodiment.

Detector 18 receives product light beams D or E. Detector 18 is configured to measure intensity values of the product light beams D or E, as described above. Detector 18 provides the measured intensity values to sensor computing device 22. According to one embodiment, amplifier 20 may provide increased signal strength from the detector 18. Other electronics, such as an analog to digital converter, may be used to provide other signal processing functions.

Next, sensor computing device 22 determines an angular displacement (A) of etalon 16 with respect to pivot point 36 based on the received intensity values from detector 18. The measured intensity values are dependent on the interference pattern of light within the internal optical path or cavity 34 of etalon 16. The interference pattern is modulated as etalon 16 moves relative to pivot point 36 as described below.

The present invention is based on the inversion of the standard wavelength-tuning application of etalon 16. Specifically, in the present invention, etalon 16 is allowed to rotate about an axis, through pivot point 36, while illuminated by a preferably coherent light beam C from light source 12. As etalon 16 rotates, the intensity of the product light beams D or E emitted from etalon 16 is modulated in a quantifiable relationship to the rotational angle (θ) of etalon 16 relative to incoming light beam C. Product light beams D or E are superpositioned such that their constructive and destructive interference results in a modulated intensity signal. Thus, instead of selecting the angle of etalon 16 relative to light beam C in order to tune the wavelength of light beam C, the change to light beams D or E emitted from etalon 16 is used to reconstruct the rotational angle (θ) of etalon 16 as further described below. This information can then be further processed to indicate vibration, rotation, temperature, or other physical parameters related to the displacement of etalon 16.

The optical path difference (δ) between first surface 28 and second surface 30 of etalon 16 is given by:

$$\delta = 4\pi n d \frac{\sin(\theta)}{\lambda} \quad (1)$$

where n is the refractive index of optical cavity 34, and d is the path length. The transmission of light (T) through etalon 16 is then given by equations (2) and (3):

$$T = \frac{1}{1 + F\sin^2(\delta)} \quad (2)$$

$$F = \frac{4R}{(1-R)^2} \quad (3)$$

where T is the transmittance through etalon 16, F is the coefficient of finesse, and R is the reflectance of first surface 28 and second surface 30. Modulation of the reflection intensity R(T) is therefore given by equation (4):

$$R(T) = 1 - T \quad (4)$$

The transmitted power is seen to be a function of the angle θ of etalon 16 with respect to pivot point 36, which also corresponds to the angle of incidence. Upon a change in the angle θ, that is rotation of etalon 16 that sweeps an arc of length L*θ, where L is the length of etalon 16, the transmitted optical power will also change and be modulated periodically. The resolution of system 10 can be selected by choosing the thickness of the etalon (d) or tuned by varying other parameters in the optical path difference expression for δ (n, λ).

According to one embodiment, sensor computing device 22 can also determine direction of motion of etalon 16 based on the modulation amplitude sign as it changes relative to the previous known state of the modulation.

Next, sensor computing device 22 may further determine physical parameters (e.g., acceleration, rotation, or temperature) related to etalon 16 based on the angular displacement of etalon 16. The angular displacement may be empirically correlated to displacement of the object depending the application in which the system is utilized. The displacement over time may then be used to calculate values such as linear acceleration or rotation of the object, depending on the application.

According to another embodiment, etalon 16 exhibits a change in refractive index in direct correlation to changes in temperature. Sensor computing device 22 can utilize drift signatures in the intensity signal, due to the temperature dependence of the index of refraction of etalon 16, to determine temperature change at etalon 16. As the interference intensity modulates through the rotation of etalon 16, a temperature dependent change of the index of refraction shifts the center wavelength of the interference maximum intensity. Interferometric sampling measurements can discern this wavelength shift to determine changes in the operating temperature of the system based on the temperature change impacting etalon 16.

A further aspect of the invention relates to a method for measuring vibration of an object. The method involves providing the system of the present invention and coupling the housing to a surface of the object. The intensity values for plurality the product light beams are measured over a period of time. Any change in position of the etalon relative to the one or more pivots over the period of time is determined based on the measured intensity values over the period of time. An acceleration value for the object is determined over the period of time based on the change in position of the etalon over the period of time to measure the vibration of the object.

According to one embodiment, the system of the present invention may be coupled to an object as described above. Angular displacement of etalon 16 may be empirically correlated to vibration, or changes in acceleration, of the object. The vibration of the object may further be utilized to determine physical parameters related to the object, such as vibration (acceleration), rotation, or temperature based on changes of position of the object, which are correlated to angular displacement of etalon 16.

A further aspect of the invention relates to a method for monitoring the condition of an object. The method involves providing the system according to an aspect of the present invention and coupling the housing to a surface of the object. The intensity values for the product light beams are measured over a period of time. Any change in position of the etalon relative to the one or more pivot points over the period of time is determined based on the measured intensity values. A frequency value for the object over the period of time is determined based on the change in position of the etalon. The determined frequency value is monitored over a period of time for changes in the frequency value.

Figure 8:
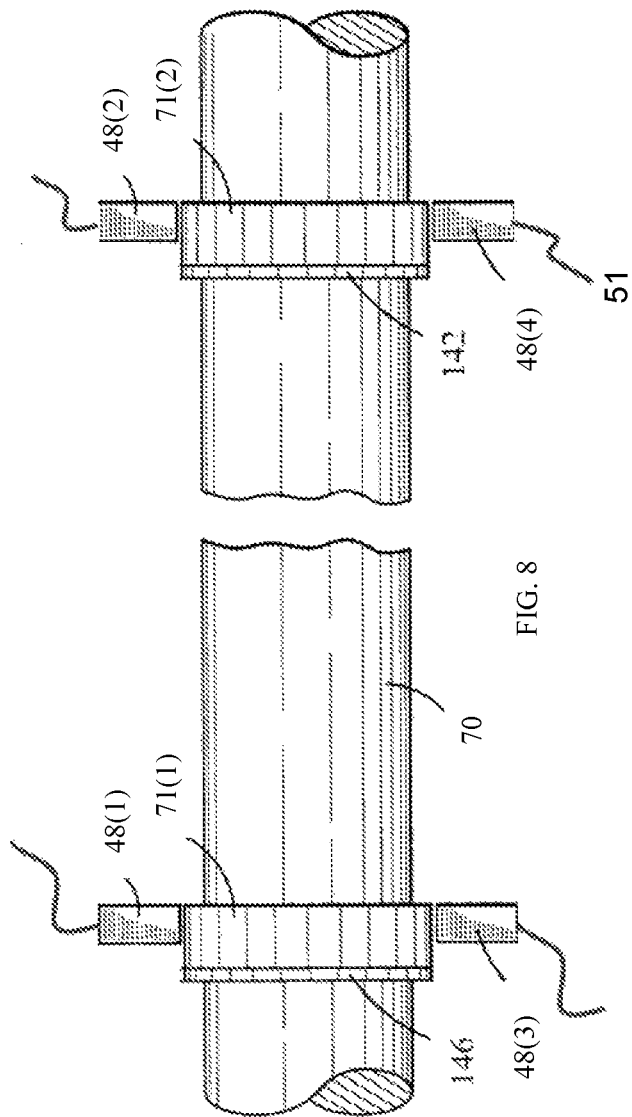
FIG. 8 is a side perspective view of a non-static structure including four housings of the present invention, each of the housings including an etalon, coupled to the non-static structure.

According to one embodiment, the system of the present invention may be coupled to an object that has a standard operating frequency, such as a rotating shaft as illustrated in FIG. 8. The change in position of etalon 16 may be utilized to determine the operating frequency by applying a fast Fourier transform to the intensity modulated signal received by detector 18. Sensor computing device 22 may monitor for changes in the standard operating frequency. These changes in frequency can serve as an indication of a potential failure state of the object. In one embodiment, sensor computing device 22 may provide an alert upon detection of a change of operating frequency above a threshold value.

EXAMPLES

Example 1—Exemplary Modulation Intensity Values for an Etalon

Figure 11A:
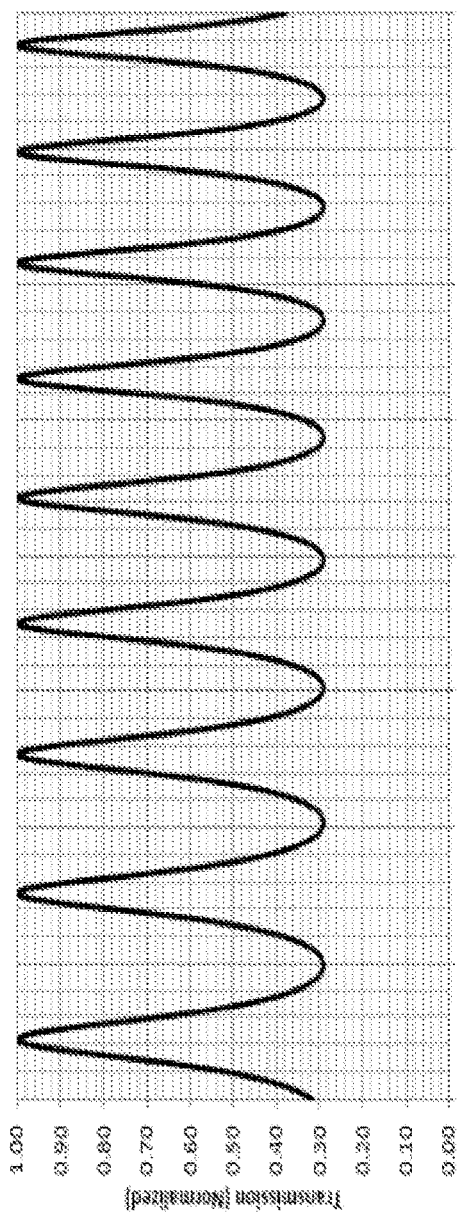
FIGS. 11A and 11B show exemplary modeling data of modulation of intensity values for etalons having different optical path lengths as a function of angle.

FIG. 11A shows modeling data of the variation in modulated transmission intensity signal as a function of angle for a glass etalon with input values for thickness of 150 µm, optical path difference of $4.5 \times 10^3$, and R value of 0.3. The simulated modeling was performed based on an input light beam at 635 nm. The modeling data was obtained using Excel.

Example 2—Exemplary Modulation Intensity Values for an Etalon

Figure 11B:
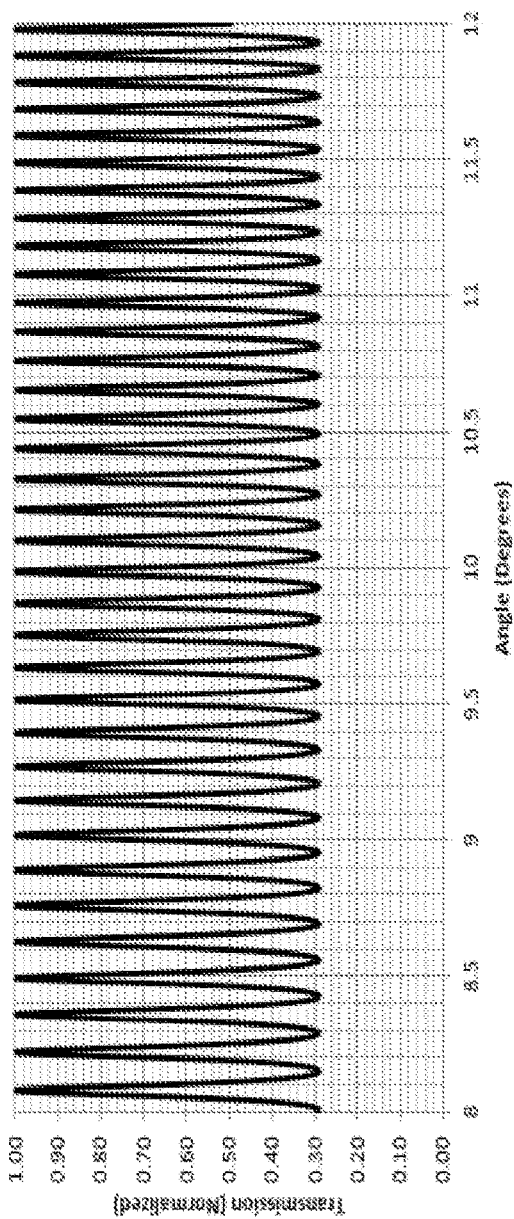

FIG. 11B shows modeling data of the variation in modulated transmission intensity signal as a function of angle for a glass etalon with input values for thickness of 600 µm, optical path difference of $1.8 \times 10^4$, and R value of 0.3. The increase in thickness creates intensity peaks located more closely together. Resolution of the obtained data can be selected by adjusting the thickness of the etalon, or other tuning parameters related to the optical path difference, such as index of refraction or wavelength. The modeling data was obtained using Excel.

Example 3—Exemplary Intensity Modulation Function Over Time

Figure 12:
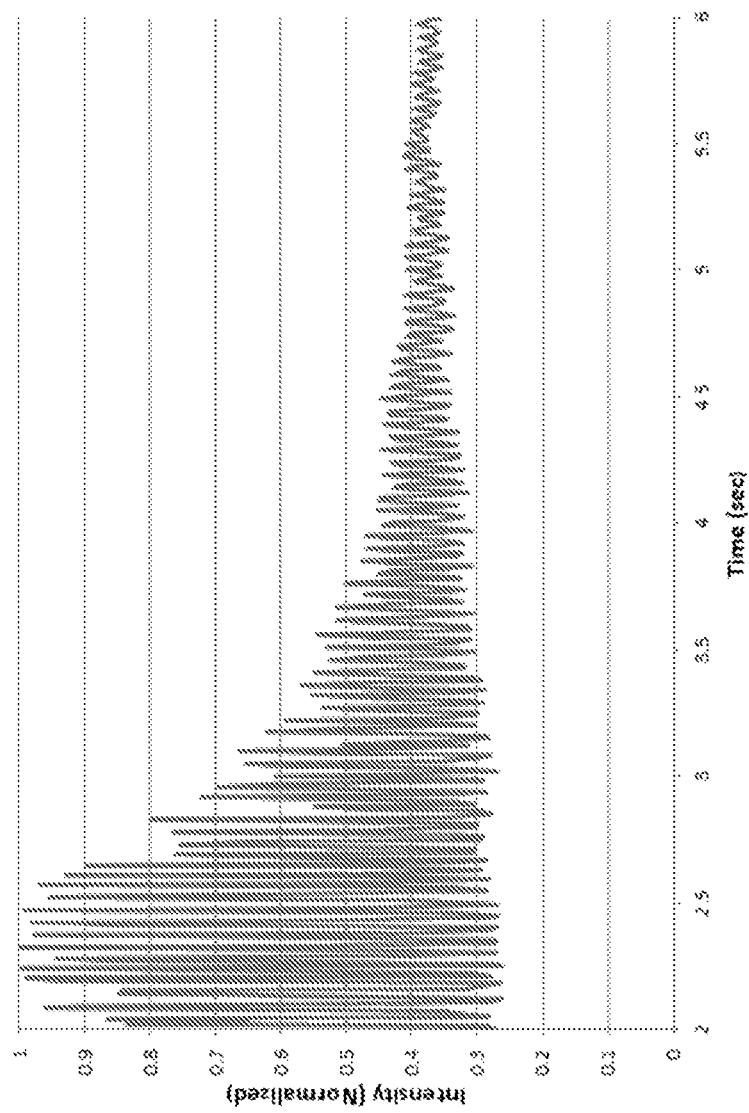
FIG. 12 illustrates an exemplary intensity modulation function over time for the etalon shown in FIG. 3.

FIG. 12 illustrates an exemplary intensity modulation function over time for the etalon shown in FIG. 3. A one millimeter thick glass etalon with an approximate optical path difference of $3 \times 10^4$ and an R value of approximately 0.5 was loaded into the structure using c-flex springs to provide the pivot points. The light source was a 635 nm laser diode and a silicon photodiode was utilized to measure the modulated intensity signal from the etalon. The etalon structure was subjected to manual vibrations using a vibration shaker set at a frequency of 20 Hz and allowed to ring down. FIG. 12 shows the resultant intensity signal over time based on the vibrations.

Figure 13:
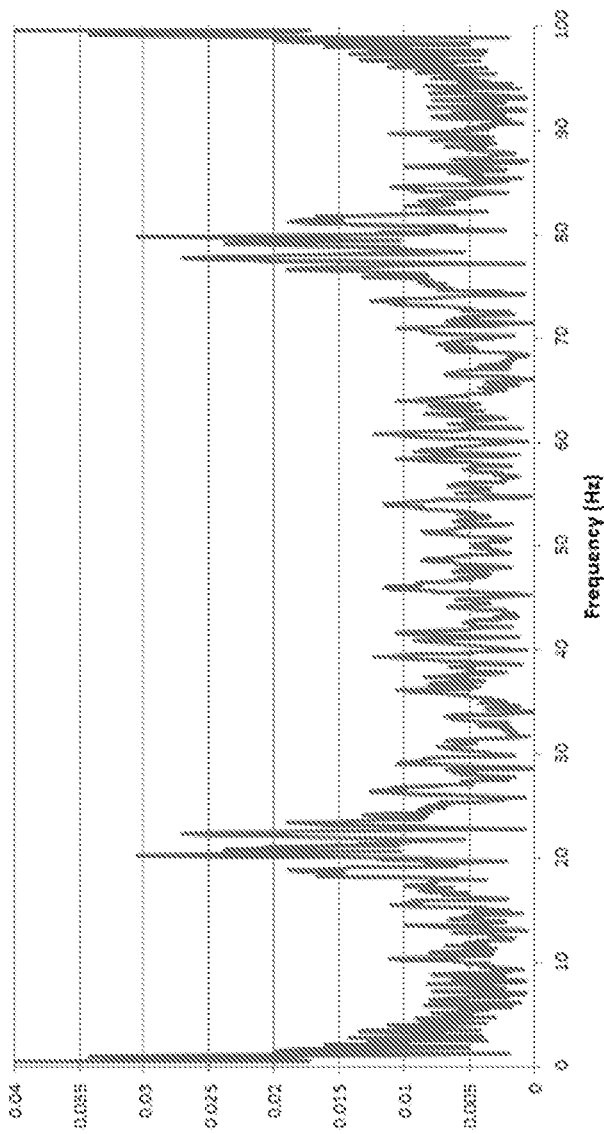
FIG. 13 illustrates a fast Fourier transform of the interference intensity modulation illustrated in FIG. 12.

Example 4—Fast Fourier Transformation to Determine Operating Frequency Based on Modulated Intensity Signal FIG. 13 illustrates the results of a fast Fourier transform operation on the intensity modulation pattern shown in FIG. 12. The data shows dominant resonant frequencies for the monitored object at 20 Hz and 80 Hz (The DC and alias 100 Hz frequency amplitudes are artifacts of limited sampling).

Example 5—Peak to Peak Voltage Comparison Versus Traditional Vibration Sensor

Figure 14:
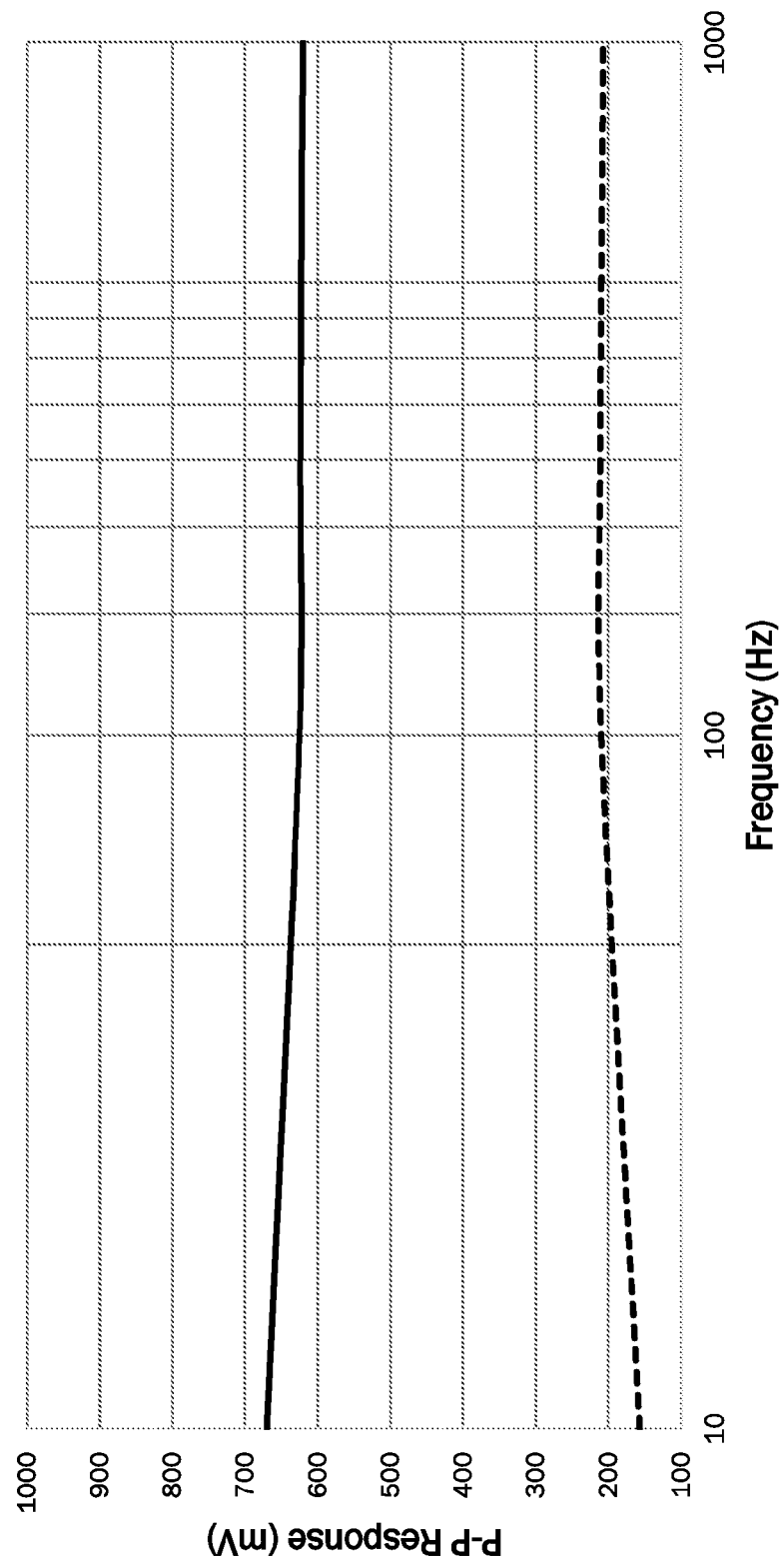
FIG. 14 illustrates an exemplary voltage response for the system of the present invention (solid line) versus an equivalent piezoelectric vibration sensor over a range of frequencies.

The system of the present invention advantageously provides an enhanced voltage response versus a traditional piezoelectric sensor over the frequency range as illustrated in FIG. 14, which provides comparative responsivity data vs. vibration frequency taken using NIST traceable Modal Shop model 9110D for an etalon device and a piezoelectric sensor. An exemplary system of the present invention in the configuration illustrated in FIGS. 5A and 5B having a 250

µm thick etalon spring loaded therein was utilized. The etalon had an approximate optical path difference of $7 \times 10^3$. A 1550 nm laser source was utilized along with an INGaAs photodiode to detect the modulated intensity values. A peak-to-peak acceleration of 0.1 m/s$^2$ was applied to the etalon device and the piezoelectric sensor using a vibrational shaker. The voltage response of an exemplary system of the present invention is shown in a solid line, while the peak-to-peak voltage response of a piezoelectric vibration sensor is show in the dashed line. The system of the present invention shows enhanced voltage response over the frequency range, particularly at low frequencies where piezoelectric sensors tend to fail.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A system comprising:
a light source configured to produce an emitted light beam;
an etalon positioned to receive the emitted light beam from the light source and configured to generate a plurality of product light beams from the emitted light beam;
a support structure coupled to the etalon at one or more pivot points, wherein the support structure is configured to be deformable to provide angular displacement of the etalon with respect to the one or more pivot points;
a detector positioned to receive the plurality of product light beams generated from the etalon having an interference pattern, the detector being configured to measure intensity values for the plurality of product light beams based on the interference pattern, wherein the detector is configured to measure modulations of the intensity values for the plurality of product light beams based on the interference of said light beams over time; and
a computing device coupled to the detector, the computing device comprising a processor and a memory coupled to the processor so that the processor executes programmed instructions stored in the memory to determine, based on the measured modulations of the intensity values, a change in position of the etalon relative to the one or more pivot points.

2. The system as set forth in claim 1, wherein the light source is a partially coherent light source.

3. The system as set forth in claim 1, wherein the detector is positioned to receive the plurality of product light beams transmitted through or reflected by the etalon.

4. The system as set forth claim 1, wherein the system comprises a plurality of etalons, each of the plurality of etalons coupled to a separate support structure.

5. The system as set forth claim 1, wherein the processor is further configured to be capable of executing at least one additional programmed instruction stored in the memory to determine an acceleration of the etalon based on the determined change in position of the etalon relative to the one or more pivot points.

6. The system as set forth in claim 1 further comprising:
a housing comprising walls defining a chamber within which the etalon is located;
a first optical fiber coupled to the light source and positioned in the housing to direct the emitted light beam to the etalon; and
a second optical fiber coupled to the detector, the second optical fiber positioned to collect the plurality of product light beams emitted from the etalon and deliver the collected plurality of product light beams to the detector.

7. A method for measuring a vibration of an object, the method comprising:
providing the system of claim 6;
coupling the housing to a surface of the object;
measuring the intensity values for the plurality of product light beams over a period of time;
determining, based on the measured intensity values over the period of time, any change in position of the etalon relative to the one or more pivot points over the period of time; and
determining, based on the change in position of the etalon over the period of time, an acceleration value for the object over the period of time to measure the vibration of the object.

8. The method as set forth in claim 7, wherein the acceleration value is one of linear acceleration or angular acceleration.

9. The method as set forth in claim 7, wherein the light source is a partially coherent light source.

10. The method as set forth in claim 7, wherein the detector is positioned to receive the plurality of product light beams transmitted through or reflected by the etalon.

11. The method as set forth in claim 7, wherein the etalon comprises a plurality of etalons, each of the plurality of etalons coupled to a separate support structure and located within a separate housing coupled to a separate object.

12. The method as set forth in claim 7 further comprising:
determining, based on the measured intensity values over the period of time, a change in temperature of an environment in which the etalon is located.

13. A method for monitoring a condition of an object, the method comprising:
providing the system of claim 6;
coupling the housing to a surface of the object;
measuring the intensity values for the plurality of product light beams over a period of time;
determining, based on the measured intensity values over the period of time, any change in position of the etalon relative to the one or more pivot points over the period of time;
determining, based on the change in position of the etalon over the period of time, a frequency value for the object; and
monitoring the determined frequency value over a period of time for changes in the frequency value to monitor the condition of the object.

14. The method as set forth in claim 13, wherein the light source is a partially coherent light source.

15. The method as set forth in claim 13, wherein the detector is positioned to receive the plurality of product light beams transmitted through or reflected by the etalon.

16. The method as set forth in claim 13, wherein the etalon comprises a plurality of etalons, each of the plurality of etalons coupled to a separate support structure and each of the etalons located within a separate housing coupled to a separate object.

17. The system as set forth in claim 1, wherein the computing device determines the change in position of the etalon relative to the one or more points based on the modulations in the intensity values over time.

* * * * *